United States Patent
Balch Barth et al.

(10) Patent No.: US 12,245,015 B2
(45) Date of Patent: Mar. 4, 2025

(54) DIRECTIONAL AUDIO PICKUP GUIDED BY FACE DETECTION

(71) Applicant: Cisco Technology, Inc., San Jose, CA (US)

(72) Inventors: Ragnvald Balch Barth, Oslo (NO); Sindre Groestad, Oslo (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 195 days.

(21) Appl. No.: 17/731,328

(22) Filed: Apr. 28, 2022

(65) Prior Publication Data

US 2023/0353966 A1    Nov. 2, 2023

(51) Int. Cl.
*H04S 5/00*      (2006.01)
*H04R 3/00*      (2006.01)

(52) U.S. Cl.
CPC .............. *H04S 5/00* (2013.01); *H04R 3/005* (2013.01); *H04R 2430/20* (2013.01)

(58) Field of Classification Search
CPC .............. H04R 29/005; H04R 2430/20; H04R 2430/25; H04R 1/326; H04R 1/406; H04R 3/005; H04R 2201/401; H04R 2201/403; H04R 2201/405; G10K 11/34; H04S 5/00

USPC .......................... 381/26, 56, 58, 91, 92, 122
See application file for complete search history.

(56) References Cited

U.S. PATENT DOCUMENTS

| | | |
|---|---|---|
| 9,210,499 B2 | 12/2015 | Sun et al. |
| 9,485,574 B2 | 11/2016 | Sun et al. |
| 10,134,414 B1 * | 11/2018 | Feng ..................... G01S 3/8083 |
| 2016/0249134 A1 * | 8/2016 | Wang ..................... H04R 3/005 |
| 2017/0265012 A1 * | 9/2017 | Tico ........................ H04S 7/303 |
| 2019/0313187 A1 | 10/2019 | Stoltze et al. |
| 2020/0092644 A1 | 3/2020 | Alders et al. |
| 2020/0145753 A1 | 5/2020 | Rollow, IV |
| 2020/0265860 A1 * | 8/2020 | Mouncer .................. H04R 5/04 |
| 2020/0304916 A1 | 9/2020 | Asfaw et al. |
| 2021/0136505 A1 | 5/2021 | Burenius |
| 2024/0004605 A1 * | 1/2024 | Krisch ..................... G06F 1/163 |

* cited by examiner

*Primary Examiner* — William A Jerez Lora
(74) *Attorney, Agent, or Firm* — Edell, Shapiro & Finnan, LLC

(57) ABSTRACT

Presented herein are techniques to enhance the audio portion of a video conference. In one embodiment, a method includes determining, using a multi-microphone array, a direction of arrival of sound signals from a user, detecting, using an image from a camera, a face of the user, determining a position of the face of the user with respect to a position of the camera, and forming a spatial beam for the multi-microphone array based on the direction of arrival of sound signals from the user and the position of the face of the user.

20 Claims, 6 Drawing Sheets

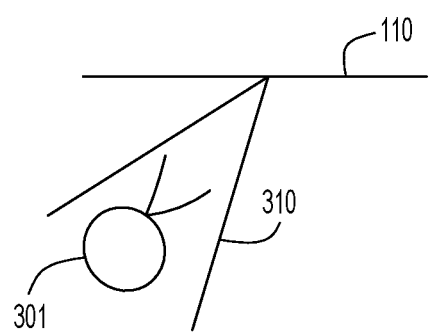
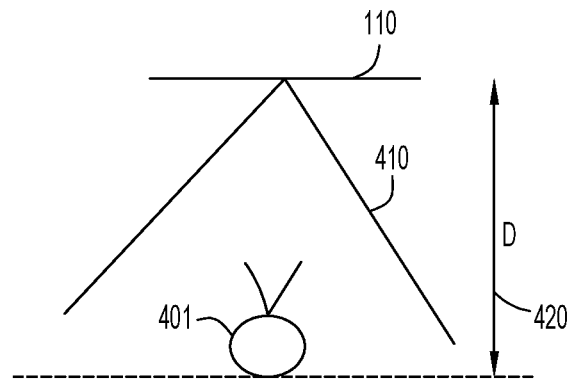
FIG.3                    FIG.4
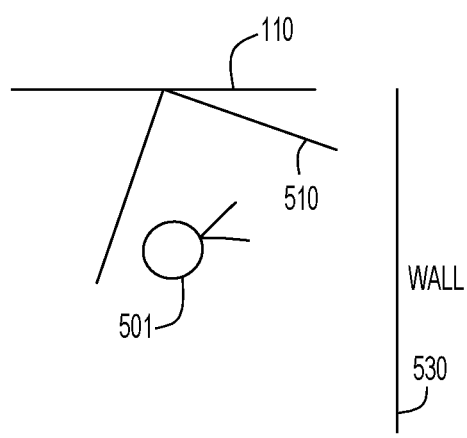
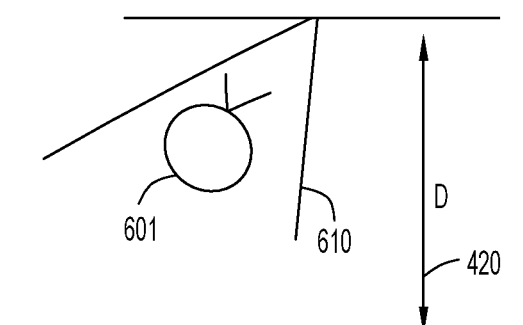
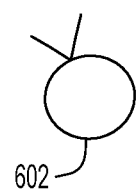
FIG.5                    FIG.6

DIRECTIONAL AUDIO PICKUP GUIDED BY FACE DETECTION

TECHNICAL FIELD

The present disclosure relates to enhancing audio quality during a videoconference.

BACKGROUND

A video endpoint is an electronic device that can allow a user to engage in a teleconference with one or more remote users, often via one or more teleconferencing servers and additional video endpoints. A video endpoint may include various components to help facilitate a session or teleconference, including one or more cameras, loudspeakers, microphones, displays, etc. Video endpoints are often utilized in professional (e.g., enterprise) settings, although they have recently found increased use in home environments as well.

At the video endpoint, a sound/audio signal can be captured by a microphone. When the environment is noisy, however, the microphone may pick up not only desired sound/audio signals from a user (e.g., speech), but may also pick up interference/noise from the surrounding area, and this interference/noise may lead to impaired voice quality resulting in an overall lower quality user experience for those listening to the audio at a remote video endpoint.

BRIEF DESCRIPTION OF THE DRAWINGS

FIGS. 3-8 show several beam forming scenarios based on a location or position of a single user, or multiple users, with respect to the video conference endpoint device, according to an example embodiment.

DESCRIPTION OF EXAMPLE EMBODIMENTS

Overview

Presented herein are techniques to enhance the audio portion of a video conference. In one embodiment, a method includes determining, using a multi-microphone array, a direction of arrival of sound signals from a user, detecting, using an image from a camera, a face of the user, determining a position of the face of the user with respect to a position of the camera, and forming a spatial beam for the multi-microphone array based on the direction of arrival of the sound signals and the position of the face of the user.

In another embodiment, a device is provided. The device includes an interface configured to enable network communications, a memory, and one or more processors coupled to the interface and the memory, and configured to: determine, using a multi-microphone array, a direction of arrival of sound signals from a user, detect, using an image from a camera, a face of the user, determine a position of the face of the user with respect to a position of the camera, and form a spatial beam for the multi-microphone array based on the direction of arrival of the sound signals and the position of the face of the user.

EXAMPLE EMBODIMENTS

Using a dual-microphone array, it is possible to calculate the direction of arrival (DOA) of different frequencies of sound waves, and attenuate selected frequencies arriving from undesired directions. Such an approach may be implemented in a video conferencing device and used to attenuate noise originating from the sides of the video conferencing device, while preserving the voice of a user located directly in front of the video conferencing device. However, in practical scenarios, the user may not necessarily be seated directly in front of the video conferencing device. And, further, the user could also be moving around while talking. Thus, scenarios, beyond those in which the user is merely sitting directly in front of the video conferencing device, should be supported such that the user can still properly be heard at a remote video conferencing device, and not be inadvertently attenuated during the course of a video conference.

Automated face-detection is now possible using, e.g., machine-learning techniques. As will be explained in more detail below, face detection can be used to detect a position/location, and possibly orientation, of the user and/or other people relative to the video conferencing device. In accordance with an embodiment, face detection information, in the form, e.g., of angles and distances with respect to the video conferencing device may then be used to configure the dual-microphone array with optimized beam forming properties.

Figure 1:
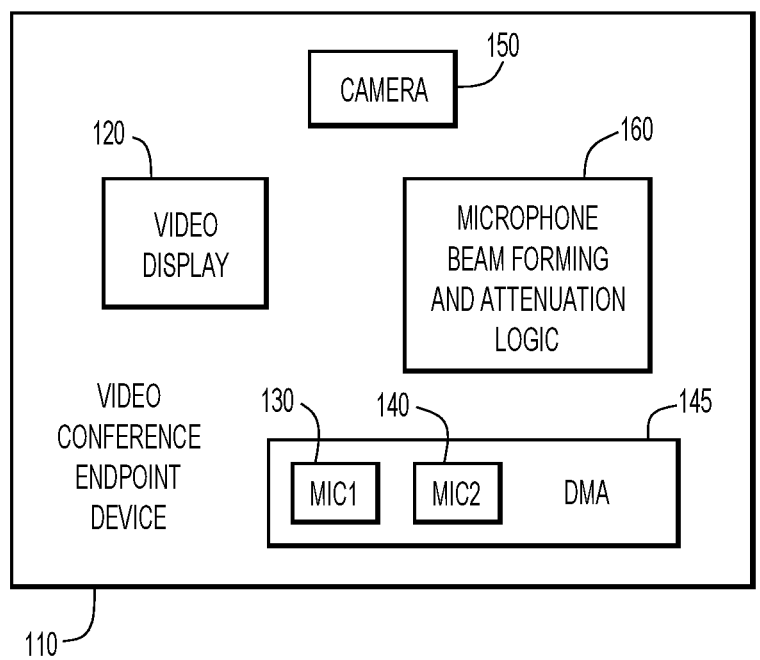
FIG. 1 depicts a video conference endpoint device including microphone beam forming and attenuation logic, according to an example embodiment.

Reference is now made to the several figures beginning with FIG. 1, which depicts a video conference endpoint device 110 that comprises microphone beam forming and attenuation logic 160, according to an example embodiment. As shown, video conference endpoint device 110 includes a video display 120, a first microphone (MIC1) 130, a second microphone (MIC2) 140, wherein MIC1 130 and MIC2 140 are part of a dual-microphone array (DMA) 145, a camera 150, and microphone beam forming and attenuation logic 160. Video conference endpoint device 110 may be implemented by an electronic or computing device 1000 described further below with respect to FIG. 10.

Figure 2:
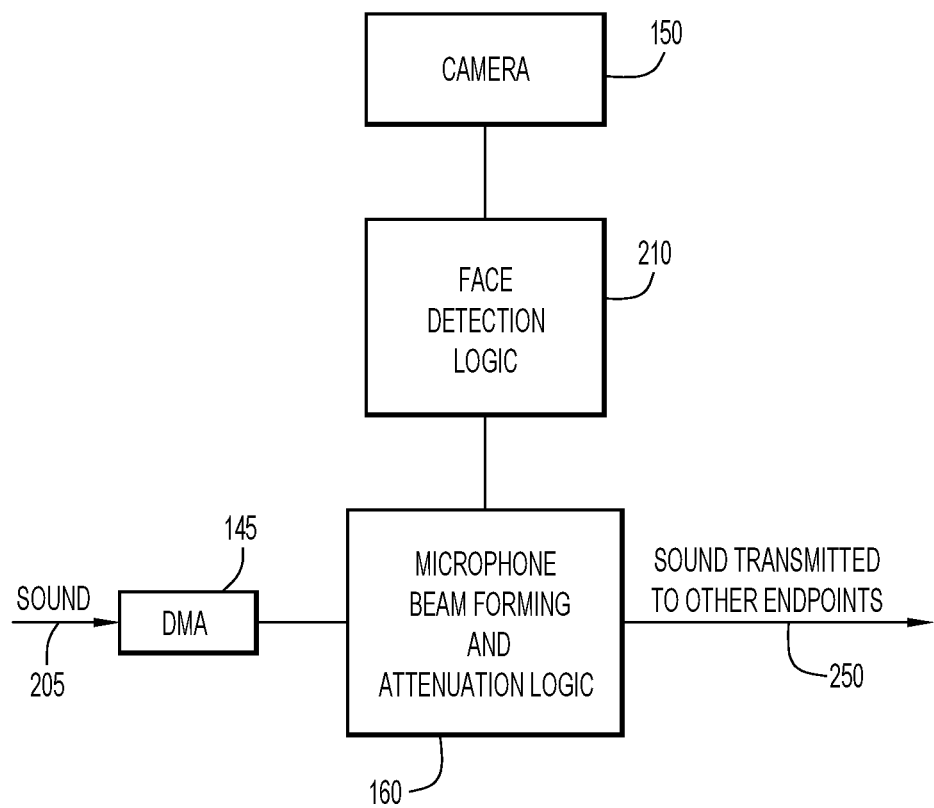
FIG. 2 is a block diagram of elements from which microphone beam forming and attenuation logic receives information that is used to configure properties of one or more microphone beams, according to an example embodiment.

FIG. 2 is a block diagram of elements from which microphone beam forming and attenuation logic 160 receives information that is used to configure properties of one or more microphone beams, according to an example embodiment. As shown in the figure, sound 205 is picked up by DMA 145, and microphone beam forming and attenuation logic 160 determines from where sounds are emanating so as to properly form a receiving sound beam (or microphone beam, or spatial beam) and attenuate sound from other locations via narrowing or broadening the microphone beam. Beam forming operations may be conducted in accordance with, e.g., the scheme described in U.S. Pat. No. 9,210,499 to Sun et al. The ultimate direction of the microphone beam, using appropriately selected filter coefficients, may be considered a "look direction" of DMA 145. Multiple microphone beams with respective look directions may also be generated.

At the same time, camera 150 feeds images of its field of view to face detection logic 210, which may operate, using, e.g., a machine learning model, to identify or recognize faces in the field of view of camera 150. Face detection logic 210 is also configured to identify the location or position (e.g., angle, distance) of any identified face(s) with respect to camera 150, and therefore also with respect to video conference endpoint device 110. Further, face detection logic 210 is configured to determine an "orientation" of a given detected face. That is, face detection logic 210 may be configured to determine whether a given detected face is looking straight toward video conference endpoint device 110, or is, perhaps, looking away from video conference endpoint device 110. Thus information regarding presence of a face, the position (e.g., angle and distance) of the face from video conference endpoint device 110, and an orientation of a detected face is provided to microphone beam forming and attenuation logic 160. With this information, microphone beam forming and attenuation logic 160 is configured to attenuate, in a more refined manner, selected sound received via DMA 145.

In other words, using the information provided by face detection logic 210, microphone beam forming and attenuation logic 160 can form, adjust, or modify one or more microphone beams to selectively attenuate sound coming from undesirable locations, or to form, adjust, or modify one or more microphone beams to ensure that sound coming from desirable locations is allowed to pass through, or be transmitted, to other remote endpoints, as indicated by arrow 250.

As will be explained further below with respect to several examples shown by FIGS. 3-8, microphone beam forming and attenuation logic 160 takes the output of face detection logic 210 and the sound from DMA 145 and determines where sound should actually be sourced so as to better configure microphone beam(s) that DMA 145 generate(s).

In a simple case, shown, e.g., in FIG. 3, there may be a single participant 301 located, generally, in front of video conference endpoint device 110. Audio received by DMA 145 is preserved (permitted to be sent to other endpoints) if the estimated DOA coincides with the position of the detected face of participant 301. The position, or direction in 3D space from the video conferencing device, of the detected face of participant 301 may be referred to as the "view direction". By leveraging the view direction, it is possible to take full advantage of the dual-microphone array 145, even when participant 301 is located to the side of (i.e., angled away from the center of) video conference endpoint device 110, as shown in FIG. 3. In other words, if there is sound coming only from one direction, and not immediately in front of, or normal to, video conference endpoint device 110, and face detection logic 210 provides information (a view direction) to microphone beam forming and attenuation logic 160 suggesting a single face at an angle consistent with the DOA of the sound, then properties (e.g., filter coefficients) of a beam 310 may be configured to assure that beam 310 has a look direction angled away from directly in front of, or normal to, video conference endpoint device 110, i.e., towards participant 301.

With reference to FIG. 4, it is noted that the accuracy of the DOA estimates may depend on a distance between a participant 401 and the dual-microphone array 145 of video conference endpoint device 110, as direct sound tends to be less dominant relative to reflections as distance increases. If participant 401 is inside a threshold distance D 420 where the policy is to not disregard participant 401, then microphone beam forming and attenuation logic 160 may set properties (e.g., filter coefficients) of a beam 410 to assure that beam 410 is formed with a widened (in this case symmetrically) geometry. This adjustment ensures that participant 401 is not mildly attenuated when moving away from video conference endpoint device 110 because of, potentially, less precise DOA estimates.

FIG. 5 illustrates a scenario in which a participant's face orientation is taken into account during a videoconference session. More specifically, in FIG. 5, participant 501 is looking to the side and not towards video conference endpoint device 110. In accordance with an embodiment, face orientation estimation of detected faces can be used to further improve the configuration of dual-microphone array 145, i.e., the properties of a look direction of beam 510. When a face is pointing directly towards dual-microphone array 145, the direct sound dominates, and DOA estimates tend to be quite precise. In such a case, microphone beam forming and attenuation logic 160 may be arranged to configure DMA 145 to accept only a narrow range of estimated angles, i.e., establish a relatively narrow beam. If, on the other hand, and as shown in FIG. 5, the face of participant 501 is directed to the side or away from video conference endpoint device 110, audio reflected by a wall 530, and/or other surfaces, may cause the DOA estimates to be less precise. In such a case, using orientation and view direction information from face detection logic 210, microphone beam forming and attenuation logic 160 is configured to configure DMA 145 to accept a wider range of estimated angles for beam 510. That is, if participant 501 is close to wall 530, strong reflections can also give good DOA estimates, but from wall 530, not from where participant 501 is sitting. So, in addition to accepting a wider range of estimated angles for beam 510, microphone beam forming and attenuation logic 160 is further configured to steer the look direction of beam 510 towards the direction that participant 501 is looking. Notably, beam 510 may be configured to be asymmetric with respect to the position or location of participant 501. Such properties for beam 510 makes it possible to accept DOA estimates coming from a potential side wall, that might not be in the view of camera 150, but which might still provide meaningful DOA estimates from the side.

FIG. 6 shows a scenario in which there are multiple people, including participant 601 and a person or non-participant 602, in front of video conference endpoint device 110 and in the field of view of camera 150. While both participant 601 and non-participant 602 may be talking, because non-participant 602 is beyond threshold distance D 420, as determined by face detection logic 210, sound from that direction is attenuated by microphone beam forming and attenuation logic 160 by configuring the properties of beam 610 to disregard sound frequencies from the view direction of non-participant 602. In this way, noise from people in the background (and to the side of a given participant) may be attenuated while preserving voices from participant(s) in closer proximity to the video conference endpoint device 110.

Figure 7:
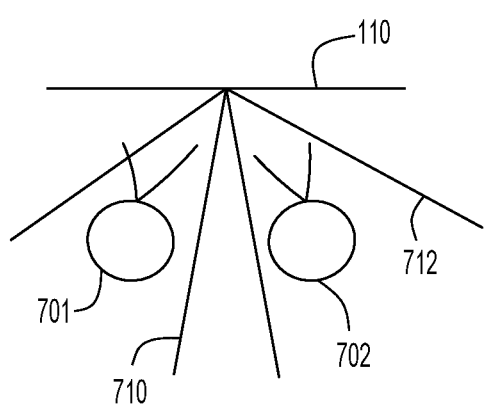
Figure 8:
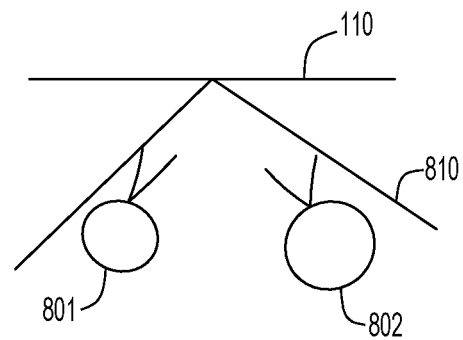

FIGS. 7 and 8 illustrate scenarios in which multiple participants 701, 702, 801, 802 or people are detected. In the case of FIG. 7, DMA 145 may be configured by microphone beam forming and attenuation logic 160 to establish a first beam 710 and a second beam 712 and, thus separate look directions for each participant 701, 702. The resulting audio signals may then be mixed. Alternatively, as shown in FIG.

8, a single beam 810 may be configured for DMA 145 that is sufficiently wide to capture sound from each participant 801, 802 together. In the scenarios of FIGS. 7 and 8, microphone beam forming and attenuation logic 160 takes into account not only the direction of arrival of sound detected by DMA 145, but also information from face detection logic 210 that is used to optimize the look direction and/or steering of one or more beams used to receive sound at DMA 145, and to attenuate sound outside of those beams.

Those skilled in the art will appreciate that microphone beam forming and attenuation logic 160 may be configured to operate dynamically. That is, microphone beam forming and attenuation logic 160 may be configured to continuously track information of changing positions (angle, distance) and orientation of the face of a user while the user is moving, and dynamically widen, narrow, steer, collapse or separate the beam(s), as appropriate.

In a case where no faces are detected by face detection logic 210, microphone beam forming and attenuation logic 160 may be configured to resort to some predefined default beam forming behavior, e.g., a relatively narrow beam normal to a front of video conference endpoint device 110.

Figure 9:
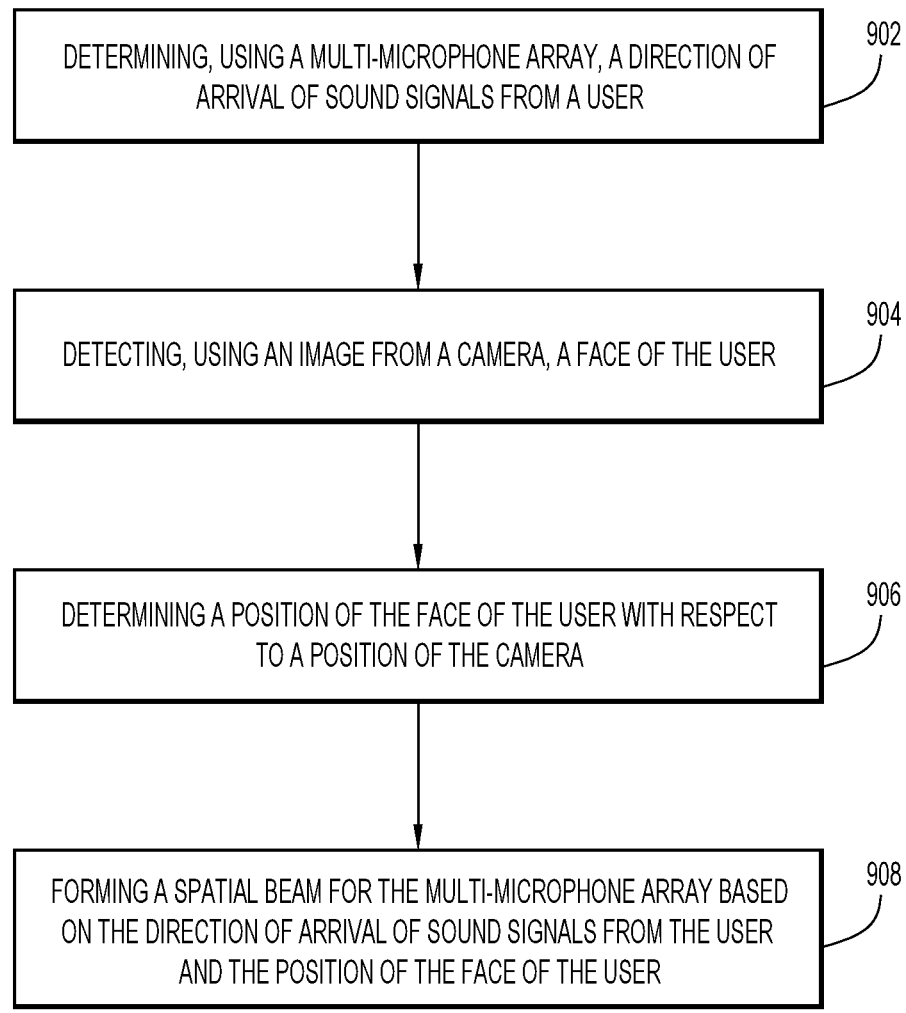
FIG. 9 is a flow chart depicting a series of operations for operating a video conference endpoint including microphone beam forming and attenuation logic, according to an example embodiment.

FIG. 9 is a flow chart depicting a series of operations for operating a video conference endpoint including microphone beam forming and attenuation logic 160, according to an example embodiment. In an embodiment, and as shown in FIG. 9, at 902, an operation includes determining, using a multi-microphone array, a direction of arrival of sound signals from a user. At 904, an operation includes detecting, using an image from a camera, a face of the user. At 906, an operation includes determining a position of the face of the user with respect to a position of the camera. And, at 908, an operation includes forming a spatial beam for the multi-microphone array based on the direction of arrival of sound signals from a user and the position of the face of the user.

Figure 10:
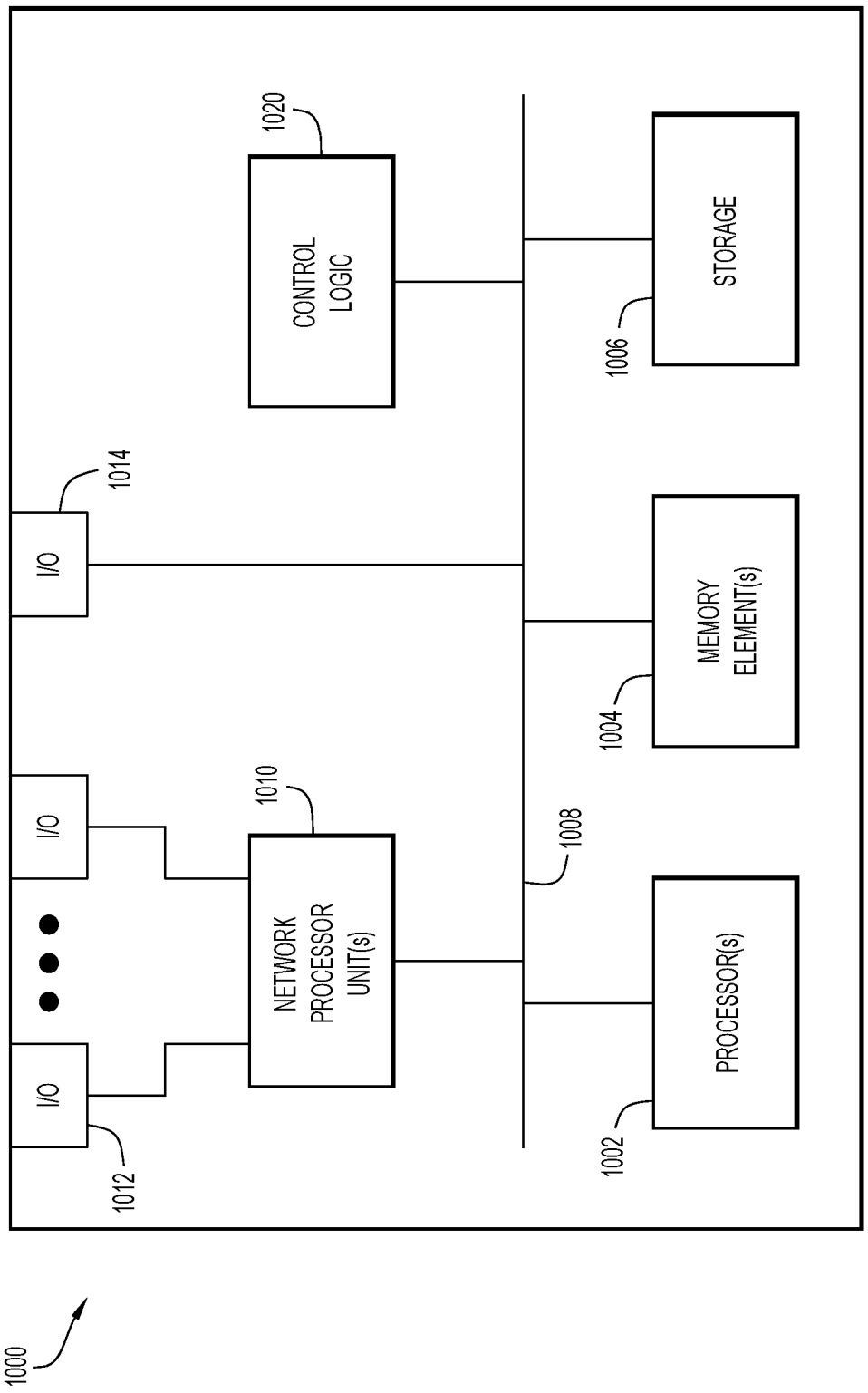
FIG. 10 is a block diagram of a device that may be configured to host a video conference endpoint including microphone beam forming and attenuation logic, and perform the techniques described herein, according to an example embodiment.

FIG. 10 is a block diagram of a device that may be configured to host a video conference endpoint including microphone beam forming and attenuation logic 160, and perform the techniques described herein, according to an example embodiment. In various embodiments, a computing device, such as computing device 1000 or any combination of similarly configured devices, may be configured as any entity/entities as discussed for the techniques depicted in connection with FIGS. 1-9 in order to perform operations of the various techniques discussed herein.

In at least one embodiment, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020 (which could include, for example, microphone beam forming and attenuation logic 160. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment a method is provided. The method may include determining, using a multi-microphone array, a direction of arrival of sound signals from a user, detecting, using an image from a camera, a face of the user, determining a position of the face of the user with respect to a position of the camera, and forming a spatial beam for the multi-microphone array based on the direction of arrival of sound signals from the user and the position of the face of the user.

In the method, forming the spatial beam for the multi-microphone array may include asymmetrically widening, with respect to the user, the spatial beam for the multi-microphone array.

In the method, forming the spatial beam for the multi-microphone array may be based on an orientation of the face of the user.

In the method, forming the spatial beam for the multi-microphone array may include: determining a distance between the user and the camera; and adjusting the spatial beam for the multi-microphone array based on the distance.

The method may also include detecting a position of a face of a person, and adjusting the spatial beam for the multi-microphone array to attenuate sound received from the position of the face of the person.

The method may further include detecting a position of a face of a second user, and forming the spatial beam for the multi-microphone array to include sound received from both the user and the second user.

In the method, forming the spatial beam for the multi-microphone array may include comprises widening the spatial beam to include both the position of the face of the user and the position of the face of the second user.

In the method, forming the spatial beam for the multi-microphone array may include configuring the spatial beam for the multi-microphone array into a first spatial beam that is directed towards the position of the face of the user and into a second spatial beam that is directed towards the position of the face of the second user.

In the method, detecting may include using machine learning to recognize, in the image from the camera, the face of the user.

The method may also include tracking changing positions of the face of the user while the user is moving, and dynamically steering the spatial beam towards the changing positions.

A device may also be provided. The device may include an interface configured to enable network communications, a memory, and one or more processors coupled to the interface and the memory, and configured to: determine, using a multi-microphone array, a direction of arrival of sound signals from a user, detect, using an image from a camera, a face of the user, determine a position of the face of the user with respect to a position of the camera, and form a spatial beam for the multi-microphone array based on the direction of arrival of sound signals from the user and the position of the face of the user.

In the device, the one or more processors may be configured to form the spatial beam for the multi-microphone array by asymmetrically widening, with respect to the user, the spatial beam for the multi-microphone array.

In the device, the one or more processors may be configured to form the spatial beam for the multi-microphone array based on an orientation of the face of the user.

In the device, the one or more processors may be configured to form the spatial beam for the multi-microphone array by: determining a distance between the user and the camera, and forming the spatial beam for the multi-microphone array based on the distance.

In the device, the one or more processors may be further configured to: detect a position of a face of a person, and adjust the spatial beam for the multi-microphone array to attenuate sound received from the position of the face of the person.

In the device, the one or more processors may be further configured to: detect a position of a face of a second user, and adjust the spatial beam for the multi-microphone array to include sound received from both the user and the second user.

In the device, the one or more processors may be further configured to form the spatial beam for the multi-microphone array by widening the spatial beam to include both the position of the face of the user and the position of the face of the second user.

In the device, the one or more processors may be further configured to form the spatial beam for the multi-microphone array by configuring the spatial beam for the multi-microphone array into a first spatial beam that is directed towards the position of the face of the user and into a second spatial beam that is directed towards the position of the face of the second user.

In yet another embodiment, one or more non-transitory computer readable storage media are provided, and are encoded with instructions that, when executed by a processor, cause the processor to: determine, using a multi-microphone array, a direction of arrival of sound signals from a user, detect, using an image from a camera, a face of the user, determine a position of the face of the user with respect to a position of the camera, and form a spatial beam for the multi-microphone array based on the direction of arrival of sound signals from the user and the position of the face of the user.

The one or more non-transitory computer readable storage media may be further encoded with instructions that, when executed by a processor, cause the processor to: form the spatial beam for the multi-microphone array by asymmetrically widening, with respect to the user, the spatial beam for the multi-microphone array.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   determining, using a multi-microphone array, a direction of arrival of sound signals from a user;
   detecting, using an image from a camera, a face of the user;
   determining a position of the face of the user with respect to a position of the camera; and
   forming a spatial beam for the multi-microphone array based on the direction of arrival of sound signals from the user and the position of the face of the user, wherein forming the spatial beam for the multi-microphone array includes widening the spatial beam for the multi-microphone array to include both a location of the user and a location to which the user is looking when the user is looking away from a position of the camera.

2. The method of claim 1, wherein forming the spatial beam for the multi-microphone array comprises asymmetrically widening, with respect to the user, the spatial beam for the multi-microphone array.

3. The method of claim 1, wherein forming the spatial beam for the multi-microphone array is based on an orientation of the face of the user.

4. The method of claim 1, wherein forming the spatial beam for the multi-microphone array comprises:
   determining a distance between the user and the camera; and
   adjusting the spatial beam for the multi-microphone array based on the distance.

5. The method of claim 1, further comprising detecting a position of a face of a person; and
   adjusting the spatial beam for the multi-microphone array to attenuate sound received from the position of the face of the person.

6. The method of claim 1, further comprising detecting a position of a face of a second user; and
   forming the spatial beam for the multi-microphone array to include sound received from both the user and the second user.

7. The method of claim 6, wherein forming the spatial beam for the multi-microphone array comprises widening the spatial beam to include both the position of the face of the user and the position of the face of the second user.

8. The method of claim 6, wherein forming the spatial beam for the multi-microphone array comprises configuring the spatial beam for the multi-microphone array into a first spatial beam that is directed towards the position of the face of the user and into a second spatial beam that is directed towards the position of the face of the second user.

9. The method of claim 1, wherein detecting comprises using machine learning to recognize, in the image from the camera, the face of the user.

10. The method of claim 1, further comprising tracking changing positions of the face of the user while the user is moving, and dynamically steering the spatial beam towards the changing positions.

11. A device comprising:
    an interface configured to enable network communications;
    a memory; and
    one or more processors coupled to the interface and the memory, and configured to:
       determine, using a multi-microphone array, a direction of arrival of sound signals from a user;
       detect, using an image from a camera, a face of the user;
       determine a position of the face of the user with respect to a position of the camera; and
       form a spatial beam for the multi-microphone array based on the direction of arrival of sound signals from the user and the position of the face of the user, by widening the spatial beam for the multi-microphone array to include both a location of the user and a location to which the user is looking when the user is looking away from a position of the camera.

12. The device of claim 11, wherein the one or more processors are configured to form the spatial beam for the multi-microphone array by asymmetrically widening, with respect to the user, the spatial beam for the multi-microphone array.

13. The device of claim 11, wherein the one or more processors are configured to form the spatial beam for the multi-microphone array based on an orientation of the face of the user.

14. The device of claim 11, wherein the one or more processors are configured to form the spatial beam for the multi-microphone array by:
   determining a distance between the user and the camera; and
   forming the spatial beam for the multi-microphone array based on the distance.

15. The device of claim 11, wherein the one or more processors are further configured to:
   detect a position of a face of a person; and
   adjust the spatial beam for the multi-microphone array to attenuate sound received from the position of the face of the person.

16. The device of claim 11, wherein the one or more processors are further configured to:
   detect a position of a face of a second user; and
   adjust the spatial beam for the multi-microphone array to include sound received from both the user and the second user.

17. The device of claim 16, wherein the one or more processors are further configured to form the spatial beam for the multi-microphone array by widening the spatial beam to include both the position of the face of the user and the position of the face of the second user.

18. The device of claim 16, wherein the one or more processors are further configured to form the spatial beam for the multi-microphone array by configuring the spatial beam for the multi-microphone array into a first spatial beam that is directed towards the position of the face of the user and into a second spatial beam that is directed towards the position of the face of the second user.

19. One or more non-transitory computer readable storage media encoded with instructions that, when executed by a processor, cause the processor to:
   determine, using a multi-microphone array, a direction of arrival of sound signals from a user;
   detect, using an image from a camera, a face of the user;
   determine a position of the face of the user with respect to a position of the camera; and
   form a spatial beam for the multi-microphone array based on the direction of arrival of sound signals from the user and the position of the face of the user, by widening the spatial beam for the multi-microphone array to include both a location of the user and a location to which the user is looking when the user is looking away from a position of the camera.

20. The one or more non-transitory computer readable storage media of claim 19, further encoded with instructions that, when executed by a processor, cause the processor to:
   form the spatial beam for the multi-microphone array by asymmetrically widening, with respect to the user, the spatial beam for the multi-microphone array.

\* \* \* \* \*